US012693918B2

(12) United States Patent
Gadkari et al.

(10) Patent No.: US 12,693,918 B2
(45) Date of Patent: Jul. 28, 2026

(54) DATA SYNCHRONIZATION WITHOUT MIDDLEWARE

(71) Applicant: SAP SE, Walldorf (DE)

(72) Inventors: Mohit V. Gadkari, Bangalore (IN); Anirudh Prasad, Malappuram (IN); Pankaj Kumar Agrawal, Bangalore (IN); Yatish Nagaraja, Bangalore (IN); Kopal Jauhari, Bangalore (IN); Namrata ., Muzaffarpur (IN); Jovin Jijo, Thrissur (IN)

(73) Assignee: SAP SE, Walldorf (DE)

( * ) Notice: Subject to any disclaimer, the term of this patent is extended or adjusted under 35 U.S.C. 154(b) by 83 days.

(21) Appl. No.: 18/611,107

(22) Filed: Mar. 20, 2024

(65) Prior Publication Data

US 2024/0231975 A1 Jul. 11, 2024

Related U.S. Application Data

(63) Continuation of application No. 17/834,329, filed on Jun. 7, 2022, now Pat. No. 11,972,312.

(51) Int. Cl.
*G06F 9/44* (2018.01)
*G06F 9/54* (2006.01)
(Continued)

(52) U.S. Cl.
CPC .............. *G06F 9/548* (2013.01); *G06F 9/541* (2013.01); *G06F 16/235* (2019.01); *G06F 16/275* (2019.01); *G06F 9/4488* (2018.02)

(58) Field of Classification Search
CPC ...................................................... G06F 9/548
(Continued)

(56) References Cited

U.S. PATENT DOCUMENTS 6,529,948 B1 3/2003 Bowman-Amuah
7,822,781 B2 10/2010 Greene et al.
(Continued)

FOREIGN PATENT DOCUMENTS

WO WO-2021/037684 A1 3/2021

OTHER PUBLICATIONS

"Extensibility Guide for SAP Business Integrity Screening," User Guide, SAP SE, 108 pages, Nov. 16, 2020.
(Continued)

*Primary Examiner* — Timothy A Mudrick
(74) *Attorney, Agent, or Firm* — Sterne, Kessler, Goldstein & Fox P.L.L.C.

(57) ABSTRACT

Disclosed herein are system, method, and computer program product embodiments for synchronizing data in a source system to an application without relying on middleware. An embodiment operates by performing an initial load of records for an object for an application from a source system, thereby retrieving a first set of records. The embodiment first maps the first set of records to the object using a transform template. The embodiment creates the object in the application using the first set of records based on the first mapping. The embodiment performs a delta load of records for the object from the source system, thereby retrieving a second set of records. The embodiment second maps the second set of records to the object using the transform template. The embodiment then updates the object using the second set of records based on the second mapping.

21 Claims, 3 Drawing Sheets

100

(51) Int. Cl.
    *G06F 16/23*        (2019.01)
    *G06F 16/27*        (2019.01)
    *G06F 9/448*        (2018.01)

(58) Field of Classification Search
    USPC ........................................................ 707/609
    See application file for complete search history.

(56)                 References Cited

U.S. PATENT DOCUMENTS

| | | |
|---|---|---|
| 8,612,406 B1 | 12/2013 | Said et al. |
| 9,411,864 B2 | 8/2016 | Gilder et al. |
| 2002/0165724 A1 | 11/2002 | Blankestejin |
| 2011/0022431 A1 | 1/2011 | Ameling et al. |
| 2013/0198103 A1 | 8/2013 | Echter et al. |
| 2017/0220658 A1* | 8/2017 | Goldmann .............. G06F 16/27 |
| 2018/0095952 A1 | 4/2018 | Daljit |
| 2018/0096001 A1 | 4/2018 | Soza |

OTHER PUBLICATIONS

"Integration of Asset Central Foundation with SAP EAM," SAP SE, 42 pages, Aug. 2, 2019.
Ramamoorthy, KK, "Building data lakes with SAP on AWS," from https://aws.amazon.com/blogs/awsforsap/building-data-lakes-with-sap-on-awas/, 6 pages, Nov. 27, 2019.

* cited by examiner

200

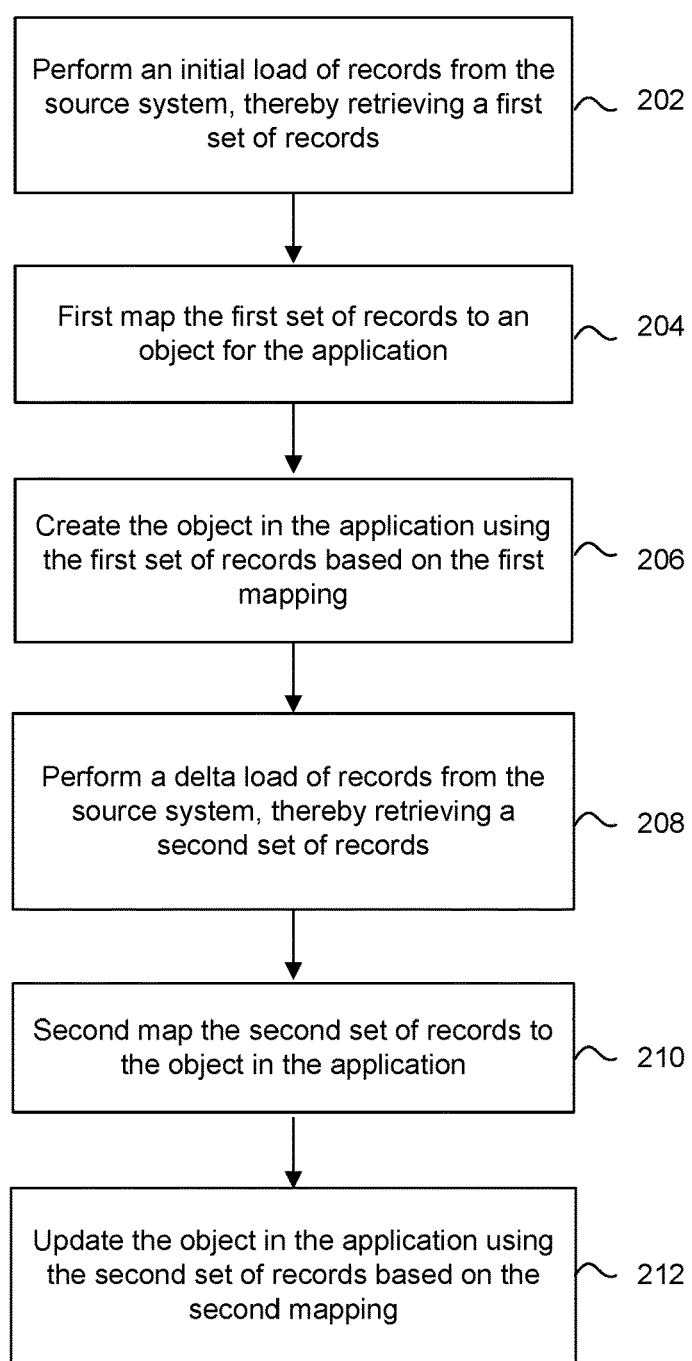

Perform an initial load of records from the source system, thereby retrieving a first set of records ~ 202

First map the first set of records to an object for the application ~ 204

Create the object in the application using the first set of records based on the first mapping ~ 206

Perform a delta load of records from the source system, thereby retrieving a second set of records ~ 208

Second map the second set of records to the object in the application ~ 210

Update the object in the application using the second set of records based on the second mapping ~ 212

FIG. 2

Computer System 300

DATA SYNCHRONIZATION WITHOUT MIDDLEWARE

CROSS-REFERENCE TO RELATED APPLICATIONS

This application is a continuation of U.S. Non-Provisional patent application Ser. No. 17/834,329, by Gadkari, et al., "Data Synchronization Without Middleware," filed Jun. 7, 2022, which is hereby incorporated by reference in its entirety.

BACKGROUND

There is often a need to replicate data residing in a source system (e.g., an enterprise resource planning (ERP) system) into an application (e.g., a business application framework (BAF) application) so that the application can process the data. But there are several technological problems associated with replicating the data residing in the source system into the application.

First, different source systems may provide different application programing interfaces (APIs) for an application to access the data residing in the source system. Accordingly, an application often cannot access data residing in the source system because it does not support the source system's API. Second, different source systems may store their data differently. Accordingly, an application often cannot process the data residing in the source system because it is not capable of processing data stored that way. Third, entities often want to replicate data residing in a source system into their application for processing without relying on a middleware system. But conventional approaches often require that such entities utilize a middleware system to replicate data residing in the source system into their application. Fourth, conventional data synchronization approaches are often unable to efficiently replicate data residing in a source system into an application. For example, conventional data synchronization approaches often cannot handle both initial synchronization and subsequent delta synchronization. Finally, conventional data synchronization approaches are often unable to replicate data residing in multiple source systems into an application.

BRIEF DESCRIPTION OF THE DRAWINGS

The accompanying drawings are incorporated herein and form a part of the specification.

FIG. 2 is a flowchart illustrating a process for synchronizing data residing in a source system to an application without relying on a middleware system, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for synchronizing data residing in a source system to an application without relying on a middleware system.

Figure 1:
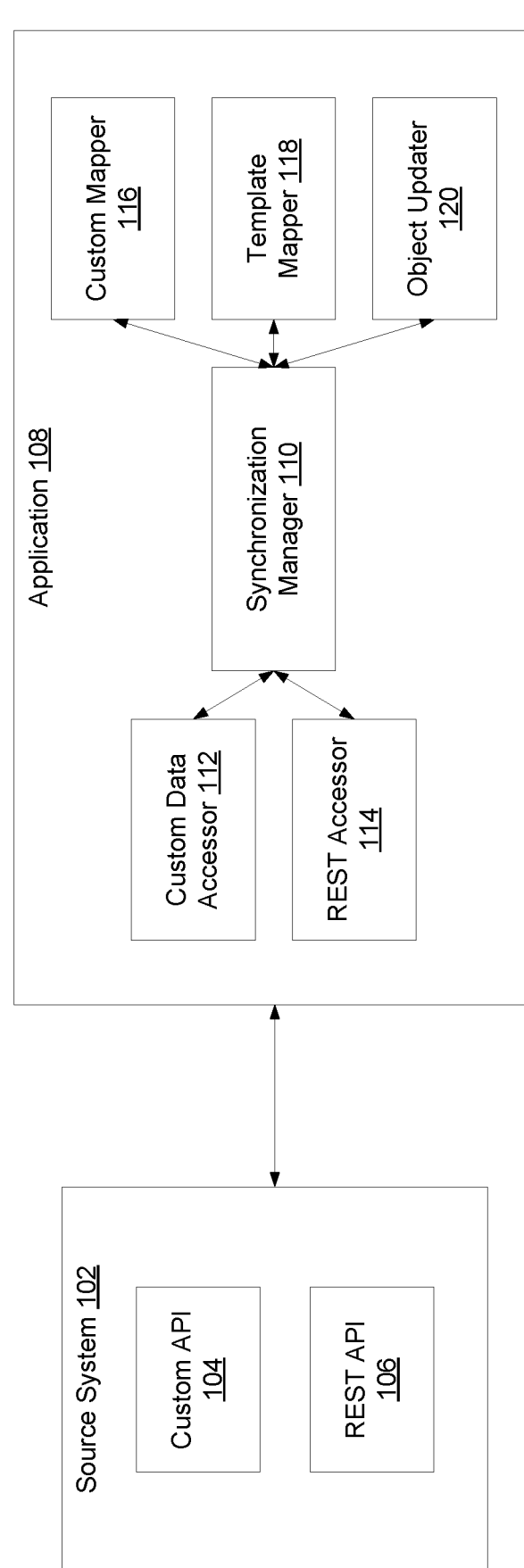
FIG. 1 is a block diagram of a system that synchronizes data residing in a source system to an application without relying on a middleware system, according to some embodiments.

FIG. 1 is a block diagram of a system 100 that synchronizes data residing in a source system to an application without relying on a middleware system, according to some embodiments. System 100 can include source system 102 and application 108.

Source system 102 can be a server, cloud computing system, computer cluster, virtual machine, container, desktop computer, laptop, tablet, smartphone, or other device as would be appreciated by a person of ordinary skill in the art. For example, source system 102 can be an enterprise resource planning (ERP) system.

Source system 102 may include custom application programing interface (API) 104. Custom API 104 may be an API for an application (e.g., application 108) to access data in source system 102 according to a custom data access implementation. Source system 102 may include Representational State Transfer (REST) API 106. REST API 106 may be API for an application (e.g., application 108) to access data in source system 102 according to the REST software architectural style. For example, REST API 106 may be an Open Data Protocol (OData) API.

Application 108 can be a computer program designed to carry out a specific task unrelated to the operation of the computer itself. For example, application 108 can be a business application framework (BAF) application. Application 108 can be executed on a server, cloud computing system, computer cluster, virtual machine, container, desktop computer, laptop, tablet, smartphone, or other device as would be appreciated by a person of ordinary skill in the art.

Application 108 may include synchronization manager 110. Synchronization manager 110 may orchestrate the synchronization of data from a source system (e.g., source system 102) to application 108. For example, synchronization manager 110 may synchronize data in the source system to an object (e.g., a BAF object) in application 108. Application 108 may include custom data accessor 112 and/or REST accessor 114. Synchronization manager 110 may orchestrate the synchronization of data from a source system (e.g., source system 102) to application 108 through custom data accessor 112 and/or REST accessor 114. Custom data accessor 112 may interact with custom API 104 in source system 102. REST accessor 114 may interact with REST API 106 in source system 102.

Application 108 may include custom mapper 116 and/or template mapper 118. Synchronization manager 110 may orchestrate the synchronization of data from a source system (e.g., source system 102) to application 108 by mapping the data received from the source system to an object being synchronized in application 108. Custom mapper 116 may map the data received from the source system to an object being synchronized according to a custom coded mapping implementation. Template mapper 118 may map the data received from the source system to an object being synchronized according to a transform template.

Application 108 may include object updater 120. Synchronization manager 110 may orchestrate the synchronization of data from a source system (e.g., source system 102) to application 108 by using object updater 120 to create and/or update an object being synchronized in application 108 based on the mapped data.

Source system 102 may be communicatively coupled to application 108. For example, source system 102 may communicate with application 108 over a communications path, which may be wired and/or wireless (or a combination thereof), and which may include any combination of LANs, WANs, the Internet, etc. Control logic and/or data may be transmitted to and from application 108 via the communication path.

To synchronize data residing in source system 102 to application 108, application 108 may use synchronize manager 110 to orchestrate the synchronization. Synchronization manager 110 may be a part of application 108. Synchronization manager 110 may perform a three step process to replicate one or more records from source system 102 to an object being synchronized in application 108.

First, synchronization manager 110 may retrieve one or more packages of data from source system 102. Synchronization manager 110 may retrieve a package of data from source system 102 as part of an initial load operation or a delta load operation for an object being synchronized. Synchronization manager 110 may perform the initial load operation or a delta load operation using background job processing. In other words, synchronization manager 110 may perform the initial load operation or a delta load operation as a job. Synchronization manager 110 may perform a job on-demand. Synchronization manager 110 may also schedule a job for periodic execution.

Second, synchronization manager 110 may map the retrieved package of data to an object being synchronized (e.g., a BAF object) in application 108. Synchronization manager 110 may map the retrieved package of data to the object being synchronized in application 108 using custom mapper 116 or template mapper 118. Finally, synchronization manager 110 may create or update the object being synchronized in application 108 based on the mapped data. Synchronization manager 110 may create or update the object being synchronized in application 108 using object updater 120.

Synchronization manager 110 may perform the three step process to replicate one or more records from source system 102 to an object being synchronized in application 108 according to a metadata file. The metadata file may specify a synchronization configuration for each object being synchronized. The metadata file may also specify an independent synchronization configuration for each source system 102 from which an object is synchronized.

The synchronization configuration for each object being synchronized may include various configuration data. The synchronization configuration may specify a data access type for retrieving data from a given source system 102. For example, the synchronization configuration may specify that application 108 is to retrieve data from the given source system 102 using a REST API (e.g., via REST accessor 114). By way of further example, the synchronization configuration may specify that application 108 is to retrieve data from the given source system 102 using an OData API (e.g., via REST accessor 114). The synchronization configuration may also specify that application 108 is to retrieve data from a given source system 102 using a custom data access implementation (e.g., via custom data accessor 112). The synchronization configuration may specify the location of the custom data access implementation.

Synchronize manager 110 may perform a synchronization operation as a job. For example, synchronization manager 110 may perform an initial load of records, a delta load of records, or a delta deletion of records from source system 102 as a job. Synchronize manager 110 may track the execution of a job. For example, synchronize manager 110 may store the status of the job so that application 108 can determine whether an object being synchronized in application 108 is current or out-of-date (e.g., due to errors).

The object being synchronized may also store various information. In some aspects, the object being synchronized be organized as a tree of nodes. The root node of the object may store a key that identifies the source system (e.g., source system 102) that the object is being synchronized from. The object being synchronized may also track the execution of various synchronization jobs per source system. The object being synchronized may also store the status information that indicates whether the object is current or out-of-date due (e.g., due to errors).

As discussed, synchronize manager 110 may operate with various modules to perform the three step process to replicate one or more records from source system 102 to an object being synchronized in application 108. For example, synchronize manager 110 may operate with custom data accessor 112, REST accessor 114, customer mapper 116, template mapper 118, and object updater 120. Synchronize manager 110 may coordinate the operation of these modules according to the metadata file.

To perform the first step of the three step process to replicate one or more records from source system 102 to an object being synchronized in application 108, synchronization manager 110 may perform an initial load operation or delta load operation using various data accessor modules. For example, synchronization manager 110 may perform the first step using REST accessor 114 or custom data accessor 112.

In the first step, application 108 can perform an initial load of records from source system 102 or a delta loads of records from source system 102. Application 108 may perform the initial load of records from source system 102 prior to processing the object being synchronized. Application 108 may perform a delta load of records from source system 102 after performing the initial load of records. A delta load of records may overwrite data in the object being synchronized. This may include data that was previously replicated by the initial load of records or by a previous delta load of records.

An initial load of records may be a one-time loading of all the records that are available in source system 102 to an object being synchronized in application 108. Depending on the amount of data in source system 102, the initial load of records may be a long running job (e.g., running up to multiple hours). It is often the case that application 108 may need the data from source system 102 to be completely replicated to the object being synchronized before processing the object. Therefore, it is often the case that application 108 cannot be used until the initial load of records is complete.

Because the volume of data to be synchronized is often very high for the initial load of records, there is an incentive to split the data to be synchronized into smaller chunks (also referred to as packages) that are each retrievable in a single call. To perform the initial load of records for the object being synchronized, application 108 can continuously fetch records from source system 102 based on a given package size and a last successfully fetched record identifier. More specifically, application 108 can continuously fetch records from source system 102 for the object being synchronized based on a package size specified in the metadata file for the object being synchronized.

Application 108 can use synchronization manager 110 to trigger the initial load of records (or one or more delta loads of records from source system 102). To perform the initial load of records, application 108 may utilize REST Accessor 114 to transmit a request (e.g., a GET request) to REST API 106 at source system 102. REST API 106 may be an OData API. Application 108 may also use custom data accessor 112 to transmit a request to Custom API 104 at source system 102. Application 108 may use custom data accessor 112 where the metadata file specifies that application 108 should access source system 102 using a custom data access implementation. For example, this may occur where source system 102 does not make its data available via a REST API (e.g., an OData API).

To perform an initial load of records for an object being synchronized in application 108, application 108 can transmit an OData GET request to REST API 106 at source system 102. The request can be for a portion of the records stored in source system 102 that are associated with the object being synchronized. The request may be based on a package size specified in the metadata file for the object being synchronized. This approach can allow application 108 to access the portion of records from source system 102 in a single call. For example, application 108 can transmit the request with the following OData query options:

$top=50 & $orderBy=objectID & $filter=ObjectID gt ' '

This request may cause source system 102 to return the first 50 records from source system 102 starting with the record having the smallest objectID. After the request is completed, application 108 can store the returned set of records. Application 108 can also store the largest objectID present in the returned set of records in a last successfully fetched record identifier (also referred to as lastSuccessfullyFetchedRecordIdentifier).

Application 108 can use last successfully fetched record identifier to subsequently retrieve the remaining records to be replicated from source system 102. For example, application 108 may transmit another request (e.g., an OData GET request) to REST API 106 at source system 102. This request can be for the next set of records stored in source system 102 that are associated with the object being synchronized. The request may be based on the package size and the last successfully fetched record identifier. For example, application 108 can transmit the next request with the following OData query options:

$top=50 & $orderBy=objectID & $filter=ObjectID gt 'lastSuccessfullyFetchedRecordIdentifier'

This request may cause the source system 102 to return the next 50 records from source system 102 starting with the first record having a larger record identifier than the last successfully fetched record identifier. After the request is completed, application 108 can store the returned next set of records. Application 108 can also store the largest record identifier present in the returned set of records in last successfully fetched record identifier, thereby replacing the previous largest record identifier.

Application 108 can repeat the above process until the number of records retrieved in response to a single request is less than the package size. In other words, application 108 can continue to use the last successfully fetched record identifier to retrieve the remaining records to be replicated from source system 102 until the number of records retrieved in response to a single request is less than the package size. Application 108 can include the $inlinecount OData query option in a request to REST API 106 at source system 102 to receive the number of records retrieved by the request.

Application 108 can also use synchronization manager 110 to perform a delta load of records from source system 102 to the object being synchronized. A delta load of records may represents record changed in source system 102 since the performing the initial load of records from source system 102. Application 108 may perform a delta load of records from source system 102 after performing the initial load of records. A delta load of records may overwrite data in the object being synchronized. This may include data that was previously replicated by the initial load of records or by a previous delta load of records.

To perform the delta load of records, application 108 may utilize REST Accessor 114 to transmit a request (e.g., a GET request) to REST API 106 at source system 102. Application 108 may also use custom data accessor 112 to transmit a request to Custom API 104 at source system 102. Application 108 may use custom data accessor 112 where the metadata file specifies that application 108 should access source system 102 using a custom data access implementation. For example, this may occur where source system 102 does not make its data available via a REST API (e.g., an OData API).

Application 108 may perform a delta load of records according to an event-driven approach. Application 108 can subscribe to events on one or more records in a source system (e.g., source system 102) and be notified by the source system when there are any data changes to the records. Application 108 can then synchronize the delta changes with the object being synchronized in application 108.

Application 108 may also perform a delta load of records using a polling based approach. Application 108 may periodically poll a source system (e.g., source system 102) to check if there have been any changes to the records at the source system. If so, application 108 can replicate the changes to the object being synchronized in application 108. To enable such polling, the source system (e.g., source system 102) may expose a last change timestamp (also referred to as lastChangeTimestamp) for the records in source system 102. The last change timestamp of a record may specify the last time the record was changed at source system 102.

To perform a delta load of records for an object being synchronized in application 108, application 108 can transmit an OData GET request to REST API 106 at source system 102. The request can be for a portion of the updated records stored in source system 102 that are associated with the object being synchronized. The request may be based on a package size specified in the metadata file for the object being synchronized. The request may also be based on a last successful synchronization timestamp (also referred to as lastSuccessfulSynchronizationTimestamp). In the case of an initial delta load of records (e.g., a first delta load of records after an initial load records), the last successful synchronization timestamp may be when the initial load of records was successfully completed. In the case of a non-initial delta load of records, the last successful synchronization timestamp may be when the immediately preceding delta load of records was successfully completed.

For example, application 108 can transmit the request with the following OData query options:

$top=50 & $orderBy=objectID & $filter=lastChangeTimestamp gt '<lastSuccessfulSynchronizationTimestamp>' and ObjectID gt ' '

This request may cause source system 102 to return the first 50 updated records from source system 102 starting with the record having the smallest objectID. After the request is completed, application 108 can store the returned set of records. Application 108 can store the largest objectID present in the returned set of records in a last successfully fetched record identifier.

Application 108 can use the last successfully fetched record identifier to subsequently retrieve the remaining updated records to be replicated from source system 102. For example, application 108 may transmit another request (e.g., an OData GET request) to REST API 106 at source system 102. This request can be for the next set of updated records stored in source system 102 that are associated with the object being synchronized. The request may be based on the package size, the last successfully fetched record identifier, and the last successful synchronization timestamp. For example, application 108 can transmit the next request with the following OData query options:

$top=50 & $orderBy=objectID & $filter=lastChangeTimestamp gt '<lastSuccessfulSynchronizationTimestamp>' and ObjectID gt 'lastSuccessfullyFetchedRecordIdentifier'

This request may cause the source system 102 to return the next 50 updated records from source system 102 starting with the first record having a larger record identifier than the last successfully fetched record identifier. After the request is completed, application 108 can store the returned set of updated records. Application 108 can also store the largest record identifier present in the returned set of records in the last successfully fetched record identifier, thereby replacing the previous largest record identifier.

Application 108 can repeat the above process until the number of records retrieved in response to a single request is less than the package size. In other words, application 108 can continue to use the last successfully fetched record identifier to retrieve the remaining updated records to be replicated from source system 102 until the number of records retrieved in response to a single request is less than the package size. Application 108 can include the $inlinecount OData query option in a request to REST API 106 at source system 102 to retrieve the number of records retrieved by the request. Once the number of records retrieved in response to a single request is less than the package size, application 108 can store the timestamp of when the request was completed in the last successful synchronization timestamp, thereby replacing the previous last successful synchronization timestamp.

There may be various technical challenges associated with performing a delta load of records using a polling based approach. For example, one technological challenge associated with performing a delta load of records using a polling based approach may be handling deleted records on the source system (e.g., on source system 102). More specifically, polling may return the records that have been updated at the source system but not the records that have been deleted at the source system.

To solve the above technological challenge, application 108 can request the current full list of records on source system 102. Application 108 can then compare the current full list of records with the instances available in application 108. Application 108 can delete those instances in application 108 which are not in the current full list of records fetched from source system 102.

Application 108 can also solve this technological problem by determining the list of instances available on application 108. Application 108 can then transmit an OData GET request to REST API 106 at source system 102 to find instances which are not available on source system 102 anymore. Application 108 can accomplish this by first determining a list of records in application 108. Application 108 can then transmit an OData GET request to REST API 106 at source system 102. The request can be for a portion of the list of records stored in source system 102. The request may be based on a threshold list size (e.g., 50 records). The threshold list size may be specified in the metadata file. For example, application 108 can transmit the request with the following OData query options:

$top=50 & $orderBy=objectID & $filter=ObjectID gt ' '

This request may cause source system 102 to return the first 50 record identifiers or records in source system 102 starting with the record having the smallest objectID. After the request is completed, application 108 can store the returned set of record identifiers. Application 108 can also store the largest objectID present in the returned set of record identifiers in a last successfully fetched record identifier.

Application 108 can use the last successfully fetched record identifier to subsequently retrieve the remaining record identifiers of records in source system 102. For example, application 108 may transmit another request (e.g., an OData GET request) to REST API 106 at source system 102. This request can be for the next set of record identifiers of records stored in source system 102. The request may be based on the threshold list size and the last successfully fetched record identifier. For example, application 108 can transmit the next request with the following OData query options:

$top=50 & $orderBy=objectID & $filter=ObjectID gt 'last successfully fetched record identifier'

This request may cause the source system 102 to return the next 50 record identifiers of records in source system 102 starting with the first record having a larger record identifier than the last successfully fetched record identifier. After the request is completed, application 108 can store the returned set of record identifiers. Application 108 can also store the largest record identifier present in the returned set of record identifiers in last successfully fetched record identifier, thereby replacing the previous largest record identifier.

Application 108 can repeat the above process until the number of record identifiers retrieved in response to a single request is less than the threshold list size. In other words, application 108 continue to use the last successfully fetched record identifier to subsequently retrieve the remaining record identifiers of records in source system 102 until the number of record identifiers retrieved in response to a single request is less than the threshold list size. Application 108 can include the $inlinecount OData query option in a request to REST API 106 at source system 102 to receive the number of record identifiers retrieved by the request.

After application 108 retrieves the complete list of record identifiers of record in source system 102, application 108 can compare the determined list of record identifiers of records in application 108 to the complete list of record identifiers returned from source system 102. If application 108 determines that a record identifier is present in the determined list of record identifiers of records in application 108 but not in the complete list of record identifiers returned from source system 102, application 108 can delete the missing data.

After completing the initial load of records or a delta load of records, application 108 may perform the second step of mapping the loaded records to an object being synchronized (e.g., a BAF object). Application 108 can map the loaded records to the objects being synchronized according to the metadata file. For example, the metadata file may specify whether to map the loaded records to the object being synchronized using a declarative (or metadata) based approach (e.g., using a transform template) or a custom code-mapping implementation. In the case of a declarative based approach, application 108 can map the loaded records to the object being synchronized using template mapper 118. In the case of a custom code-mapping implementation, application 108 can map the loaded records to the object being synchronized using custom mapper 116.

To map the loaded records to the object being synchronized using a declarative based approach, application 108 may utilize a transform template with template mapper 118. Template mapper 118 may utilize a transform template specified in the metadata file. Each transform template may be specific to the object being synchronized. A transform template may specify rules to map elements of the loaded records to elements of the object being synchronized. For example, a transform template may specify one or more rules that map elements of a JavaScript Object Notation (JSON) record retrieved from source system 102 to corresponding elements in the object being synchronized.

To map the loaded records to the object being synchronized using a custom code-mapping implementation, application 108 may utilize custom mapper 116. Custom mapper 116 may be a custom code-mapping implementation. Application 108 may provide the loaded records to custom mapper 116, and custom mapper 116 may map the loaded records to the object being synchronized.

Application 108 may provide the loaded records to custom mapper 116 based on the metadata file specifying that custom mapper 116 is to be used for the object being synchronized. Customer mapper 116 may be utilized where mapping the loaded of records to the object being synchronized is not possible using a declarative based approach.

In some cases, multiple source systems may be replicating data to the object being synchronized. This can cause various technological problems. First, there may be key clashes as a result of multiple source systems replicating data to the object being synchronized. For example, it may happen that the same value for a key field is used by record instances from more than one source system. When data from these source systems is replicated to the object being synchronized, a key clash will occur. To solve this technological problem, application 108 may add a discriminator element (e.g., a discriminator node) to the object being synchronized. For example, application 108 may add a field in the discriminator element for Tenant URL/Tenant ID. Synchronization manager 110 can then use this field in the discriminator element to resolve key clashes as a result of multiple source systems replicating data to the object being synchronized.

Second, in the case of delta deletion, a delta deletion run for a source system may delete record instances coming from other source systems. To solve this technological problem, application 108 may similarly add a discriminator element (e.g., a discriminator node) to the object being synchronized. For example, application 108 may add a field in the discriminator element for Tenant URL/Tenant ID. Synchronization manager 110 can then use this field in the discriminator element to avoid deleting record instances coming from other source systems.

After completing the mapping, application 108 may perform the third step of creating the new object to be synchronized from the mapped data or updating the existing object being synchronized with the mapped data. Application 108 may perform the third step using object updater 120.

In the case of creating the new object to be synchronized, object updater 120 may convert the mapped data from the second step (e.g., from custom mapper 116 or template mapper 118) to the modifications required for the object being synchronized.

In the case of updating an existing object being synchronized, object updater 120 may need to identify the correct portions of the object to be updated. As discussed, the object being synchronized may be organized as a tree of nodes. Thus, object updater 120 may need to identify the correct nodes to be updated for the incoming data payload.

In some aspects, a unique identifier per node may be directly available in the incoming data payload. To perform an update, object updater 120 can directly map the node identifier in the incoming data payload to a node identifier in a node in the object being synchronized.

In some other aspects, object updater 120 can generate a unique identifier from a concatenation of fields using a transform template. Object updater 120 can then map the unique identifier for the incoming data payload to a node identifier in a node in the object being synchronized.

FIG. 2 is a flowchart for a method 200 for synchronizing data residing in a source system to an application without relying on a middleware system, according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 202, application 108 performs an initial load of records for an object for application 108 from source system 102, thereby retrieving a first set of records. Application 108 may perform the initial load of records via REST API 106 at source system 102. Application 108 may perform the initial load of records based on a package size. Application 108 may also perform the initial load of records based on a first last successfully fetched record identifier.

For example, application 108 may perform the initial load of records for the object by transmitting a request to source system 102 for a next set of records from source system 102 based on the package size and the first last successfully fetched object identifier. Application 108 may receive the next set of records from source system 102 in response to transmitting the request. Application 108 may store the next set of records in the first set of records. Application 108 may set the first last successfully fetched object identifier to a largest record identifier of a record in the next set of records. Application 108 may then repeat the process until a count of the next set of records is less than the package size.

In 204, application 108 first maps the first set of records to the object for application 108. For example, application 108 may map the first set of records to the object using a transform template associated with source system 102. Application 108 may also map the first set of records to the object using a custom code-mapping implementation.

In 206, application 108 creates the object to be synchronized in application 108 using the first set of records based on the first mapping. For example, object updater 120 may convert the mapped data to the modifications required for the object.

In 208, application 108 performs a delta load of records for the object from source system 102, thereby retrieving a second set of records. Application 108 may perform the delta load of records via REST API 106 at source system 102. Application 108 may perform the delta load of records based on the package size. Application 108 may also perform the delta load of records based on a last successful synchronization timestamp. Application 108 may also perform the delta load of records based on a second last successfully fetched record identifier.

Application 108 may perform the delta load of records for the object from source system 102 using a polling based approach. Application 108 may periodically poll source system 102 to check if there have been any changes to the records at source system 102. If so, application 108 can replicate the changes to the object in application 108.

For example, application 108 may perform the delta load of records for the object by transmitting a request for a next set of records from source system 102 based on the package size, the last successful synchronization timestamp, and the second last successfully fetched object identifier. Application 108 may receive the next set of records from source system 102 in response to transmitting the request. Application 108 may store the next set of records in the second set of records. Application 108 may set the second last successfully fetched object identifier to a largest record identifier of a record in the next set of records. Application 108 may then repeat the process until a count of the next set of records is less than the package size. Application 108 may then set the last successful synchronization timestamp to a timestamp of when the most recent delta load of records was completed.

Application 108 may perform a delta deletion after the delta load of records for the object. For example, application 108 may transmit a request to source system 102 for a next set of record identifiers in source system 102. Application 108 may transmit the request based on a threshold list size. Application 108 may also transmit the request based on a third last successfully fetched object identifier. Application 108 may receive the next set of record identifiers from source system 102 in response to the transmitting. Application 108 may store the next set of record identifiers in a returned set of record identifiers. Application 108 may set the third last successfully fetched object identifier to a largest record identifier of a record in the next set of record identifiers. Application 108 may then repeat the process until a count of the next set of record identifiers is less than the threshold list size. Application 108 may then compare a set of record identifiers associated with the object to the returned set of record identifiers.

In 204, application 108 second maps the second set of records to the object in application 108. For example, application 108 may map the second set of records to the object using the transform template associated with source system 102. Application 108 may also map the second set of records to the object using a custom code-mapping implementation.

In 206, application 108 updates the object in application 108 using the second set of records based on the second mapping. For example, object updater 120 may identify the correct portions of the object to be updated. Once identified, object updater 120 may update the identified portions using the mapped data.

Figure 3:
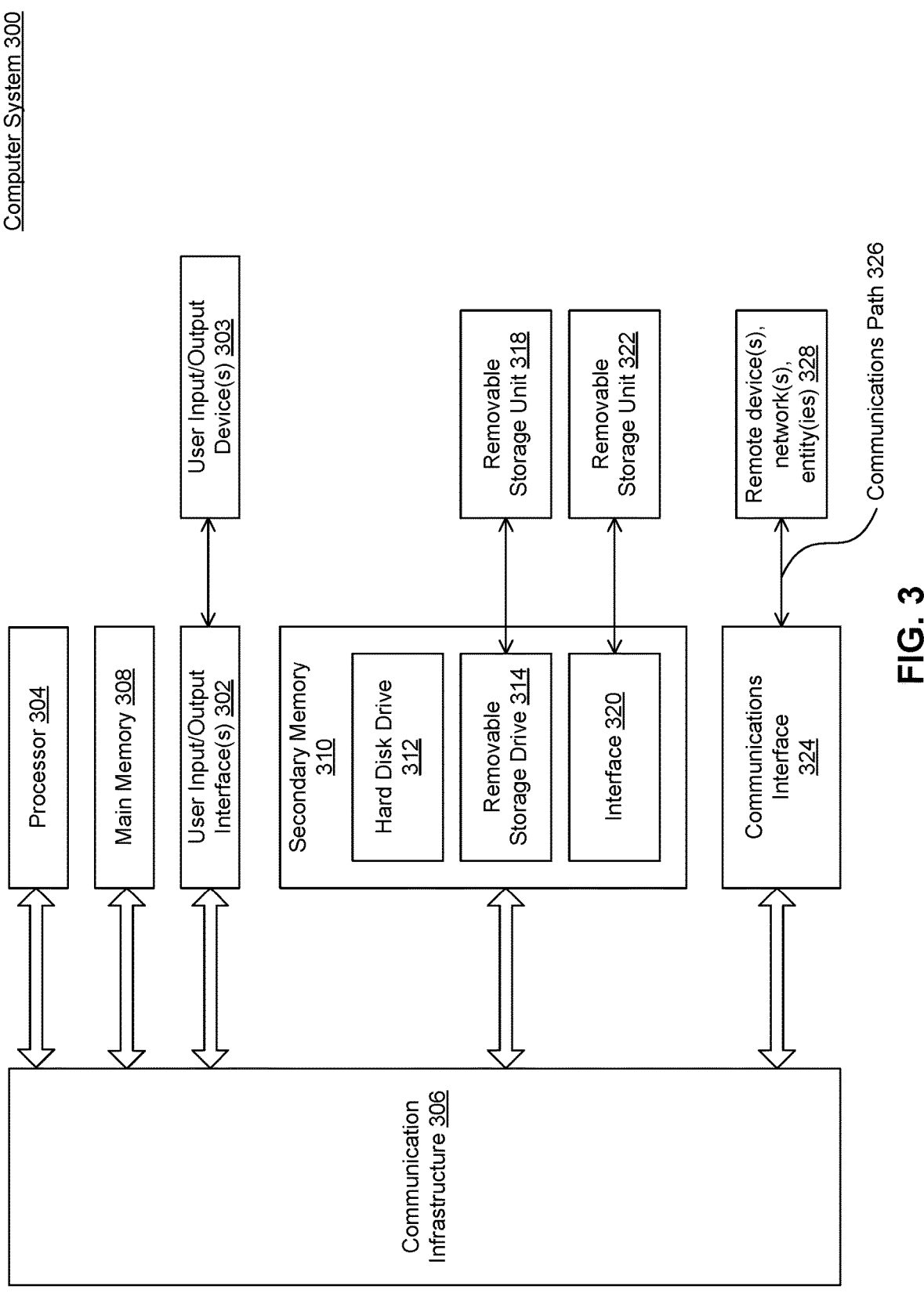
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for synchronizing a source system with an object for an application, comprising:

performing a delta load of records for the object from the source system based on a package size specifying a data chunk size that limits a number of records retrievable for the object via a single request, a last successful synchronization timestamp, and a last successfully fetched record identifier, thereby retrieving a set of records;

mapping the set of records to the object in the application using a transform template associated with the source system; and updating the object in the application using the set of records based on the mapping.

2. The computer-implemented method of claim 1, wherein the performing the delta load of records from the source system comprises:

performing the delta load of records from the source system via representational state transfer (REST) Application Programming Interface (API).

3. The computer-implemented method of claim 1, wherein the performing the delta load of records from the source system further comprises:

transmitting a request to the source system for a next set of records from the source system based on the package size, the last successful synchronization timestamp, and a second last successfully fetched record identifier;

receiving the next set of records from the source system in response to the transmitting the request;

storing the next set of records in the set of records;

setting the last successfully fetched record identifier to a largest record identifier of a record in the next set of records;

repeating the transmitting, receiving, storing, and setting until a count of the next set of records is less than the package size; and setting the last successful synchronization timestamp to a timestamp of when the most recent delta load of records was completed.

4. The computer-implemented method of claim 1, wherein the delta load of records represents records changed in the source system since performing an initial load of records from the source system.

5. The computer-implemented method of claim 1, wherein the performing the delta load of records further comprises:

performing the delta load of records from the source system using an event-driven approach.

6. The computer-implemented method of claim 1, further comprising:

transmitting a request to the source system for a next set of record identifiers in the source system based on a threshold list size and a third last successfully fetched object identifier;

receiving the next set of record identifiers from the source system in response to the transmitting;

storing the next set of record identifiers in a returned set of record identifiers;

setting the third last successfully fetched object identifier to a largest record identifier of a record in the next set of record identifiers;

repeating the transmitting, receiving, storing, and setting until a count of the next set of record identifiers is less than the threshold list size; and comparing a set of record identifiers associated with the object in the application to the returned set of record identifiers.

7. The computer-implemented method of claim 1, wherein the object is associated with metadata, and wherein the metadata comprises a template specifying a mapping of data from the source system to the object and the package size.

8. A system for synchronizing a source system with an object for an application, comprising:

a memory; and at least one processor coupled to the memory and configured to:

perform a delta load of records for the object from the source system based on a package size specifying a data chunk size that limits a number of records retrievable for the object via a single request, a last successful synchronization timestamp, and a last successfully fetched record identifier, thereby retrieving a set of records;

map the set of records to the object in the application using a transform template associated with the source system; and update the object in the application using the set of records based on the mapping.

9. The system of claim 8, wherein to perform the delta load of records from the source system, the at least one processor is further configured to:

perform the delta load of records from the source system via representational state transfer (REST) Application Programming Interface (API).

10. The system of claim 8, wherein to perform the delta load of records for the object from the source system, the at least one processor is further configured to:

transmit a request to the source system for a next set of records from the source system based on the package size, the last successful synchronization timestamp, and a second last successfully fetched record identifier;

receive the next set of records from the source system in response to the transmitting the request;

store the next set of records in the set of records;

set the last successfully fetched record identifier to a largest record identifier of a record in the next set of records;

repeat the transmitting, receiving, storing, and setting until a count of the next set of records is less than the package size; and set the last successful synchronization timestamp to a timestamp of when the most recent delta load of records was completed.

11. The system of claim 8, wherein the delta load of records represents records changed in the source system since performing an initial load of records from the source system.

12. The system of claim 8, wherein to perform the delta load of records for the object from the source system, the at least one processor is further configured to:

perform the delta load of records from the source system using an event-driven approach.

13. The system of claim 8, wherein the at least one processor is further configured to:

transmit a request to the source system for a next set of record identifiers in the source system based on a threshold list size and a third last successfully fetched object identifier;

receive the next set of record identifiers from the source system in response to the transmitting;

store the next set of record identifiers in a returned set of record identifiers;

set the third last successfully fetched object identifier to a largest record identifier of a record in the next set of record identifiers;

repeat the transmitting, receiving, storing, and setting until a count of the next set of record identifiers is less than the threshold list size; and compare a set of record identifiers associated with the object in the application to the returned set of record identifiers.

14. The system of claim 8, wherein the object is associated with metadata, and wherein the metadata comprises a template specifying a mapping of data from the source system to the object and the package size.

15. A non-transitory computer-readable medium having instructions stored thereon that, when executed by at least one computing device, cause the at least one computing device to perform operations comprising:

performing a delta load of records for an object from a source system based on a package size specifying a data chunk size that limits a number of records retrievable for the object via a single request, a last successful synchronization timestamp, and a last successfully fetched record identifier, thereby retrieving a set of records;

mapping the set of records to the object in an application using a transform template associated with the source system; and updating the object in the application using the set of records based on the mapping.

16. The non-transitory computer-readable medium of claim 15, wherein the performing the delta load of records from the source system comprises:

performing the delta load of records from the source system via representational state transfer (REST) Application Programming Interface (API).

17. The non-transitory computer-readable medium of claim 15, wherein the performing the delta load of records from the source system further comprises:

transmitting a request to the source system for a next set of records from the source system based on the package size, the last successful synchronization timestamp, and a second last successfully fetched record identifier;

receiving the next set of records from the source system in response to the transmitting the request;

storing the next set of records in the set of records;

setting the last successfully fetched record identifier to a largest record identifier of a record in the next set of records;

repeating the transmitting, receiving, storing, and setting until a count of the next set of records is less than the package size; and setting the last successful synchronization timestamp to a timestamp of when the most recent delta load of records was completed.

18. The non-transitory computer-readable medium of claim 15, wherein the performing the delta load of records from the source system further comprises:

performing the delta load of records from the source system using an event-driven approach.

19. The non-transitory computer-readable medium of claim 15, wherein the operations further comprise:

transmitting a request to the source system for a next set of record identifiers in the source system based on a threshold list size and a third last successfully fetched object identifier;

receiving the next set of record identifiers from the source system in response to the transmitting;

storing the next set of record identifiers in a returned set of record identifiers;

setting the third last successfully fetched object identifier to a largest record identifier of a record in the next set of record identifiers;

repeating the transmitting, receiving, storing, and setting until a count of the next set of record identifiers is less than the threshold list size; and comparing a set of record identifiers associated with the object in the application to the returned set of record identifiers.

20. The non-transitory computer-readable medium of claim 15, wherein the object is associated with metadata, and wherein the metadata comprises a template specifying a mapping of data from the source system to the object and the package size.

21. The computer-implemented method of claim 1, wherein the package size is specified in a metadata file for the object.

* * * * *